(12) United States Patent
Arisa Busquets

(10) Patent No.: US 9,957,997 B2
(45) Date of Patent: May 1, 2018

(54) FASTENING NUT

(71) Applicant: ILLINOIS TOOL WORKS INC., Glenview, IL (US)

(72) Inventor: Jaume Arisa Busquets, Sabadell (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days. days.

(21) Appl. No.: 15/027,254

(22) PCT Filed: Sep. 24, 2014

(86) PCT No.: PCT/US2014/057160
§ 371 (c)(1),
(2) Date: Apr. 5, 2016

(87) PCT Pub. No.: WO2015/060974
PCT Pub. Date: Apr. 30, 2015

(65) Prior Publication Data
US 2016/0245328 A1 Aug. 25, 2016

(30) Foreign Application Priority Data

Oct. 21, 2013 (ES) .................................. 201301006

(51) Int. Cl.
*F16B 37/04* (2006.01)
*F16B 33/00* (2006.01)
(52) U.S. Cl.
CPC .......... *F16B 37/043* (2013.01); *F16B 33/002* (2013.01); *F16B 37/04* (2013.01)

(58) Field of Classification Search
CPC ...... F16B 33/002; F16B 37/04; F16B 37/043; F16B 37/122
(Continued)

(56) References Cited

U.S. PATENT DOCUMENTS 2,487,330 A * 11/1949 Green ................... F16B 5/0208
411/516
2,567,902 A * 9/1951 Bedford, Jr. .......... F16B 37/043
411/112
(Continued)

FOREIGN PATENT DOCUMENTS

CN       1898474 A       1/2007
DE    202013100387 U1    3/2013
(Continued)

OTHER PUBLICATIONS

International Search Report and Written Opinion for PCT/US2014/057160 dated Dec. 12, 2014.

*Primary Examiner* — Roberta S Delisle
(74) *Attorney, Agent, or Firm* — Hauptman Ham, LLP

(57) ABSTRACT

Fastening nut, of the type used in the automobile industry for fixing panels and accessories thereto, wherein said nut is formed by a surface or base having, extending downwardly therefrom, spring elements which are flexible and resilient in a direction lateral to said vertical direction of downward extension thereof, said spring elements working in combination with a fixing plate which has openings or slits for receiving said spring elements which interfere with them; having a cylindrical tube projecting from said base and provided with an internal thread for receiving a fixing screw.

27 Claims, 1 Drawing Sheet

(58) Field of Classification Search
USPC .............. 411/172, 175, 178, 182, 508–509
See application file for complete search history.

(56) References Cited

U.S. PATENT DOCUMENTS

| | | | | | |
|---|---|---|---|---|---|
| 2,707,013 | A | * | 4/1955 | Flora | F16B 37/043 411/173 |
| 3,110,372 | A | | 11/1963 | Pierce et al. | |
| 3,869,958 | A | * | 3/1975 | Murayama | F16B 21/076 411/15 |
| 4,595,325 | A | * | 6/1986 | Moran | F16B 37/043 411/173 |
| 4,606,688 | A | * | 8/1986 | Moran | B60Q 1/0433 411/175 |
| 4,610,588 | A | * | 9/1986 | Van Buren, Jr. | F16B 37/043 411/173 |
| 4,906,152 | A | * | 3/1990 | Kurihara | F16B 37/042 174/138 D |
| 4,981,310 | A | * | 1/1991 | Belisaire | F16B 21/086 285/140.1 |
| 5,178,501 | A | * | 1/1993 | Carstairs | B62D 25/163 24/297 |
| 5,632,584 | A | * | 5/1997 | Acevedo | F16B 37/043 411/182 |
| 5,669,731 | A | * | 9/1997 | Hironaka | F16B 21/06 24/297 |
| 5,829,934 | A | * | 11/1998 | Danby | F16B 37/043 411/173 |
| 5,873,690 | A | * | 2/1999 | Danby | F16B 37/043 411/182 |
| 5,919,019 | A | * | 7/1999 | Fischer | F16B 37/043 411/112 |
| 6,095,734 | A | * | 8/2000 | Postadan | F16B 37/043 411/173 |
| 6,457,924 | B1 | * | 10/2002 | Wallace | F16B 37/02 174/58 |
| 6,726,418 | B2 | * | 4/2004 | Dickinson | F16B 37/043 411/179 |
| 2005/0042057 | A1 | | 2/2005 | Konig et al. | |
| 2006/0083601 | A1 | * | 4/2006 | Moerke | F16B 37/043 411/182 |
| 2007/0223991 | A1 | | 9/2007 | Motsch et al. | |
| 2009/0180842 | A1 | | 7/2009 | Johnson et al. | |
| 2012/0219381 | A1 | | 8/2012 | Fuentes Domingo et al. | |

FOREIGN PATENT DOCUMENTS

| | | |
|---|---|---|
| FR | 2687439 A1 | 8/1993 |
| FR | 2945844 A1 | 11/2010 |
| GB | 997596 A | 7/1965 |
| WO | 03048591 A1 | 6/2003 |
| WO | 2011056943 A1 | 5/2011 |

* cited by examiner

FASTENING NUT

RELATED APPLICATIONS

The present application is a National Phase of International Application Number PCT/US2014/057160 filed Sep. 24, 2014, and claims priority to Spanish Application Number P201301006, filed Oct. 21, 2013.

FIELD OF THE INVENTION

The present invention relates to a fastening nut, of the type used for fixing panels and applications thereto, with provision of a device for securing thereof, the special feature being that elastic fixing means are provided in a nut which, as a result of its constructional design, is quick-fitting.

PRIOR ART

A plurality of nuts exist for fixing panels and/or accessories thereto, for example in the automobile industry, these being intended to be fastened to holes formed in the panels, providing a securing point and fixing said panels. In general, said fixing means use sets of flexible legs which lock against the edges of the hole in the panel once they pass through it. These solutions, in general, are unable to provide protection against rotational movements since rotation of the part is prevented merely by the joining pressure between the legs of the clip and the surface of the panel. In some applications tightening of the fastening nut of the assembly or the accessory to be retained may force rotation of the clip nut in an undesirable manner.

It is one of the main objects of the present invention to provide a nut for fixing panels and applications thereto, provided with a control system preventing rotation of said nut.

Another of the main objects of the present invention is to provide a quick-fitting nut for fixing panels and accessories thereto which allows adaptation for use thereof with a different number of panels and which results in a solid and stable joint.

These and other advantages of the present invention will become clear during the course of the description thereof.

BRIEF DESCRIPTION OF THE INVENTION

The present invention describes a fastening nut formed by a base surface which has a threaded cylinder for receiving a screw for fixing an application, said base having, extending downward therefrom, spring elements which are flexible and resilient in a direction lateral to the vertical direction of downward extension thereof, said spring elements operating in combination with a fixing plate which has openings or slots for receiving said spring elements which interfere with them.

The panel or panels to be fixed by said invention may have different thicknesses due to the fact that the length of the spring elements allows them to be fixed in the fixing plate at different heights.

In another the possible embodiments of the present invention, said spring elements incorporate one or more retaining claws for locking the fixing plate in position and preventing said spring elements from being accidently separated or coming out.

In this way all the predefined objects are achieved by providing a rapid-fastening nut for supporting panels and accessories associated therewith which prevents rotation and can be adapted to a different number of thicknesses of panel to be fixed, in accordance with specific requirements of each application.

BRIEF EXPLANATION OF THE DRAWINGS

The invention will be understood more clearly with reference to the accompanying sheet of drawings provided merely by way of a non-limiting example of the invention.

DETAILED DESCRIPTION OF THE INVENTION

Figure 1:
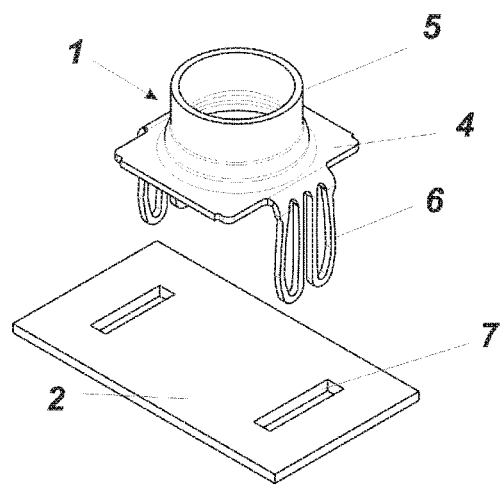
FIG. 1 shows a perspective view, with parts separated and aligned, of a nut according to one of the preferred embodiments of the present invention and a fixing plate or panel which has grooves for securing the spring elements of the nut.
Figure 2:
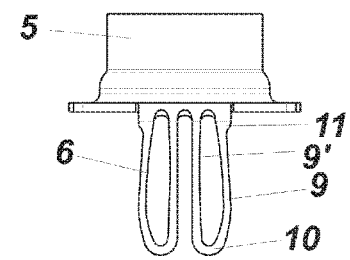
FIG. 2 shows a side view of the nut according to the preceding figure.
Figure 3:
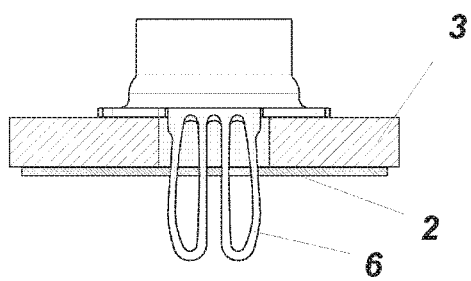
FIG. 3 is a diagrammatic illustration of the working condition of the nut according to the preceding figures, with a panel being retained in sandwich fashion between said fixing plate and the same nut.
Figure 4:
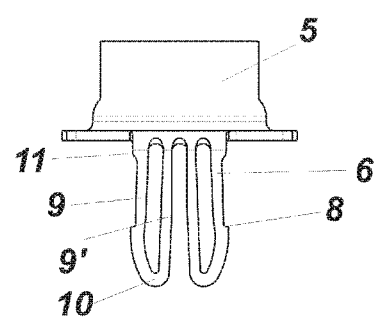
FIG. 4 is a side view of another of the possible embodiments of the nut according to the present invention.

The present invention consists of a fastening nut, for example of the type used in the automobile industry for fixing panels and accessories thereto, said nut (1) being formed by a surface or base (4) which has a threaded cylinder (5) for receiving a screw for fixing an application, said base (4) having, extending downward therefrom, spring elements (6) which are flexible and resilient in a direction lateral to said vertical direction of downward extension thereof, said spring elements (6) working in combination with a fixing plate (2) which has openings or slits (7) for receiving said spring elements (6) which interfere with them, retaining said fixing plate (2) by means of the lateral force exerted by said spring elements (6). Said openings or slits (7) may have different possible geometric forms suitable for their function, such as slotted holes or the like.

The panel (3) or panels to be fixed by the nut (1) according to the invention remain trapped in sandwich fashion between the fixing plate (2) and the base (4) of the nut (1) according to the invention.

According to its mode of use, the operator inserts the spring elements of the nut (1) inside the holes of the panel (3) to be fixed and presses the assembly against the fixing plate (2) in such a way that said spring elements (6) coincide with the grooves or slits (7) provided in said fixing plate (2). This application pressure joins together the plate (2) and panel (3) so that the spring elements (6) are arranged in their fully inserted position.

When the spring elements (6) penetrate inside the slits or grooves (7) in the fixing plate (2), they exert a double lateral force against the two inner edges thereof, in the manner of a spring, in a direction which is transverse to the direction of insertion of the nut. The retaining action obtained by said method is related to the rigidity of the material and the elastic tensioning force exerted by said spring elements (6) against the edges of the grooves (7). This fixing action occurs, moreover, at different heights of insertion of said spring elements (6), this allowing the parts to be adapted to variations in the thickness of the panel to be retained.

It should be noted that the fixing action obtained means of the nut according to the present invention and as a result of its constructional design is anti-rotational; namely it prevents the accidental rotation of the part installed, including opposing the torsional forces arising from tightening of the screw for fixing an accessory or application.

The spring element (6) is formed by a single part which has two downwardly extending legs (9 and 9') with common end (10). One of said downwardly extending legs (9'), i.e. the inner one, is more or less straight, the other one being curved outward and having, starting from the end (10), a curved surface for gradual entry, facilitating introduction of said spring element (6) inside the grooves (7) of said retention plate.

The width of the hole or groove (7) is smaller than the breadth of the legs (9, 9') of the spring element (6). Thus, when the spring element (6) is introduced inside the groove (7), i.e. two spring elements for each groove, an elastic compression of the curvature of said leg (9) against the leg (9') occurs, said compression occurring also in the other spring element which occupies the same groove (7), with its outer legs (9) pressing against the short edges of the grooves or slits (7) producing a dual elastic force which keeps the nut pressed against said fixing plate (2).

Said outward curvature of said outer downwardly extending legs (9) is used to increase the retention of the fixing plate (2) upon application of one of the components of the force in the vertical direction and toward the base (4), this force thus preventing the fixing plate (2) from being able to slide in this direction.

The leg (9) has at its base a widened zone (11) which provides said leg with greater solidity and rigidity, thus preventing a possible rotation of said base (4) owing to the effect of the screwing torque.

In another of the possible embodiments of the present invention, said spring elements incorporate one or more retaining claws (8) for locking the fixing plate in position and preventing said spring elements from being accidently separated or coming out.

In this way all the predefined objects are achieved by providing a rapid-fastening nut for supporting panels and accessories associated therewith which prevents rotation and can be adapted to different thicknesses of panel to be fixed or numbers thereof, in accordance with the specific requirements of each application.

The nut according to the invention is made preferably of spring steel.

It is understood that in the present case details with regard to finishing and form may be variable insofar as they do not modify the basic idea of the invention. The secondary claims describe all those elements which may be variable and which are included in the present invention.

What is claimed:

1. A fastening nut, of the type used in the automobile industry for fixing panels and accessories thereto, wherein said nut is formed by a surface or base of the type having, extending downwardly therefrom, spring elements, the lateral force of which retains a fixing plate by means of their tension against openings or slits which pass through said fixing plate.

2. The fastening nut as claimed in claim 1, wherein said flexible spring elements consist of two downwardly extending legs, an inner leg and an outer leg, which have a common end; said outer leg being outwardly curved.

3. The fastening nut as claimed in claim 1, wherein said outer legs of said spring elements may have one or more retaining claws.

4. The fastening nut as claimed in claim 1, wherein said outer legs of said spring elements have, starting from one end, a curved surface for gradual entry inside the grooves of said retaining plate.

5. The fastening nut as claimed in claim 1, wherein said outer legs of said spring elements have a widened zone in a zone closer to said base.

6. The fastening nut as claimed in claim 1, wherein said spring elements are arranged in groups of two, for each slit, with their outer legs pressing against the short edges of the grooves or slits of said fixing plate.

7. The fastening nut as claimed in claim 1, wherein a cylindrical tube with an internal thread protrudes from said base.

8. A fastening nut, configured to fix panels and accessories thereto, wherein said nut is formed by a surface or base and a means for applying a lateral force to an opening in a fixing plate to retain the fixing plate by means of tension against the opening that passes through the fixing plate.

9. The fastening nut as claimed in claim 8, wherein:
the means for applying a lateral force is a structure that extends downwardly from the surface or base.

10. The fastening nut as claimed in claim 8, wherein:
the means for applying a lateral force is a spring element that extends downwardly from the surface or base.

11. The fastening nut as claimed in claim 8, further comprising:
means for locking the fixing plate in position and preventing said means for applying a lateral force from being accidently separated and/or coming out of the opening.

12. The fastening nut as claimed in claim 11, wherein:
the means for locking is one or more claws that protrude laterally further than any part of the means for applying a lateral force.

13. An assembly, comprising:
the fastening nut as claimed in claim 11, and
the fixing plate, wherein
the means for applying a lateral force has separate components that respectively extend through separate openings spaced apart and separated from each other by solid structure of the fixing plate.

14. The assembly of claim 13, wherein:
the separate openings are elongated grooves having a length larger than a maximum with thereof, both the length and the width lying on a plane normal to a longitudinal direction of the fastening nut.

15. A fastening nut configured to fix panels and accessories thereto, wherein said nut is formed by a surface or base and, extending downwardly therefrom, spring elements, lateral force of which retains a fixing plate by tension thereof owing to compressive force generated by the spring elements against sidewall(s) of opening(s) which pass through said plate.

16. The fastening nut of claim 15, wherein:
the spring elements comprise:
a first spring sub-apparatus that includes a first closed looped structure and a second closed looped structure, the first looped structure extending parallel to the second loop structure; and
a second spring sub-apparatus that includes a third closed looped structure and a fourth closed looped structure, the third looped structure extending parallel to the fourth loop structure.

17. The fastening nut of claim 16, wherein:
the respective axes of the openings formed by the first and second closed looped structures are parallel to one another;
the respective axes of the openings formed by the third and fourth closed looped structures are parallel to one another.

18. The fastening nut of claim 17, wherein:
the respective axes of the openings of the first and third loop are parallel to and coaxial with one another; and
the respective axes of the openings of the second and fourth loop are parallel to and coaxial with one another.

19. The fastening nut of claim 16, wherein:
the first spring sub-apparatus is a mirror image of the second spring sub-apparatus with respect to a first plane lying on a longitudinal axis of the fastening nut; and
the sub-components of the first spring sub-apparatus is a mirror image of each other with respect to a second plane that is normal to the first plane and which second plane lines on the longitudinal axis.

20. The fastening nut of claim 16, wherein:
the first spring sub-apparatus is a mirror image of the second spring sub-apparatus; and
the first spring sub-apparatus extends perfectly parallel to the second spring sub-apparatus from the surface or base.

21. The fastening nut of claim 15, wherein:
the spring elements comprise:
    a first closed looped structure;
    a second closed looped structure;
    a third closed looped structure; and
    a fourth closed looped structure; and
the first, second third and fourth closed loop structures extends away from the surface or base in directions parallel to one another.

22. The fastening nut of claim 15, wherein:
the spring elements comprise:
    a first closed looped structure;
    a second closed looped structure;
    a third closed looped structure; and
    a fourth closed looped structure;
the first and second closed loop structures extend away from the base or surface in a generally planar manner with respect to two sides of the first and second closed loop structures;
the third and fourth closed loop structures extend away from the base or surface in a generally planar manner with respect to two sides of the first and second closed loop structures; and
one of the two sides of the first and second closed loop structures and one of the sides of the third and fourth closed loop structures face each other.

23. The fastening nut as claimed in claim 15, further comprising:
means for locking the fixing plate in position and preventing said spring elements from being accidently separated and/or coming out of the opening(s).

24. The fastening nut as claimed in claim 23, wherein:
the means for locking is one or more claws that protrude away from a surface of the spring elements beyond the spring elements.

25. An assembly, comprising:
the fastening nut as claimed in claim 15, and
the fixing plate, wherein
the spring elements comprise components that respectively extend through separate openings spaced apparat and separated from each other by solid structure of the fixing plate.

26. The assembly of claim 25, wherein:
the separate openings are elongated grooves having a length larger than a maximum with thereof, both the length and the width lying on a plane normal to a longitudinal direction of the fastening nut.

27. The assembly of claim 25, wherein:
the fastening nut includes claw elements that are configured to catch on a bottom surface of the fixing plate at a location outside the opening(s).

* * * * *